United States Patent [19]

Evins, IV

[11] Patent Number: 5,080,781
[45] Date of Patent: Jan. 14, 1992

[54] DOWN-HOLE HYDROCARBON COLLECTOR

[76] Inventor: Alexander A. Evins, IV, 3403 Hunters Run, San Antonio, Tex. 78230

[21] Appl. No.: 354,639

[22] Filed: May 18, 1989

[51] Int. Cl.$^5$ .............................................. C02F 1/40
[52] U.S. Cl. .................... 210/112; 210/119; 210/170; 210/400; 210/416.1; 210/533; 166/69; 166/369; 198/643
[58] Field of Search ............ 210/112, 119, 170, 242.3, 210/242.4, 400, 416.1, 526, 533, 386; 166/69, 369; 198/643

[56] References Cited

U.S. PATENT DOCUMENTS

| | | | |
|---|---|---|---|
| 1,007,282 | 10/1911 | Hawley | 198/643 |
| 1,373,720 | 4/1921 | Gish | 210/112 |
| 2,391,642 | 12/1945 | Reed | 198/643 |
| 3,508,663 | 4/1970 | Brill | 210/400 |
| 3,695,451 | 10/1972 | Schmidt, Jr. et al. | 210/386 |
| 3,764,016 | 10/1973 | Sewell et al. | 210/924 |
| 3,774,685 | 11/1973 | Rhodes | 166/369 |
| 4,243,529 | 1/1981 | Strauss | 210/242.1 |
| 4,274,957 | 6/1981 | Koller | 210/172 |
| 4,582,604 | 4/1986 | Bashaw | 210/924 |
| 4,652,372 | 3/1987 | Threadgill | 210/242.3 |

Primary Examiner—Robert A. Dawson
Assistant Examiner—Matthew O. Savage
Attorney, Agent, or Firm—Donald R. Comuzzi

[57] ABSTRACT

A portable low-viscosity hydrocarbon collector incorporating an endless absorption belt for collecting low-viscosity hydrocarbon liquids from a well and pumping those liquids to the surface. The collector incorporates a plurality of rollers which may be aligned in a configuration that enables its ideal placement at any depth within a confined space such as a surface-sealed well bore. The rollers cooperate to remove the low-viscosity hydrocarbons from the endless belt without causing premature squeezing of the belt so that those hydrocarbons can be collected in a specific gravity separating receptacle for separating the hydrocarbons from any water in order to enhance the purity of the collected hydrocarbons. The collector is also provided with a single motor which drives not only the endless belt through the rollers, but also a piston pump for pumping collected hydrocarbons to the surface.

17 Claims, 3 Drawing Sheets

DOWN-HOLE HYDROCARBON COLLECTOR

BACKGROUND OF THE INVENTION

1. Field of Use

The present invention relates to an apparatus and method for removing a low-viscosity hydrocarbon from a body of liquid through the employment of an endless flexible belt which absorbs the hydrocarbon from the liquid for deposit in a container. More particularly, the present invention relates to a low-viscosity hydrocarbon collector which utilizes an endless belt in a confined below-grade environment, such as a well bore, and which incorporates rollers for removal of the low viscosity hydrocarbons from the endless belt.

2. Prior Inventions

Contamination of groundwater with hydrocarbons is an important concern for all sectors of society. In order to minimize or eliminate the adverse effects of such contamination, environmental protection agencies (both state and federal) require complete removal of any hydrocarbons discovered in the groundwater. Monitoring wells located in the proximity of sites susceptible to contamination by hydrocarbons are the usual means by which groundwater purity is monitored and, in the event that contamination is discovered in a monitoring well, diligent efforts must be made to remove all of the hydrocarbons floating on the surface of the groundwater—even the monolayer sheen which indicates the presence of the slightest contamination.

However, such removal of hydrocarbons from the surface of the groundwater in monitoring wells can be quite costly and time-consuming. Significant contamination may lead to months, or even years, of diligent clean-up efforts, especially if the contamination becomes absorbed into the subsurface formations, only to be slowly leached into the groundwater.

To make matters worse, the previous options for achieving complete removal of the floating hydrocarbons have been limited, if not completely inadequate. In those situations where it is economically justifiable, floating hydrocarbons can be removed, along with the entire contents of a monitoring well, through vacuum operations; however, such operations usually require periodic evacuation of the well with a vacuum truck, sometimes as often as twice a week, for a cost of about $400 per evacuation. Automatic bailing equipment, which systematically bails the top surface of the liquid in the well, can be employed on a similar basis but, again, the equipment and/or services are expensive and the operation must be performed on a frequent basis. Moreover, both of the mentioned options are inefficient in that substantial amounts of groundwater are removed with the hydrocarbons as a matter of course, which unnecessarily increases the volume and cost of proper liquid disposal.

More sophisticated equipment, such as the patented "Filter-Scavenger" (U.S. Pat. No. 4,243,529) produced by Oil Recovery Systems, Inc., is available to separate and retrieve only the hydrocarbons from a monitoring well by filtering the hydrocarbons from the water within the well bore and then pumping the filtered hydrocarbons to the surface with a surface-mounted pump. Oil Recovery Systems, Inc. also produces a "Probe-Scavenger" system which recovers only hydrocarbons by controlling the operation of a submersible pump through the employment of a probe that differentiates between hydrocarbons and water. However, each of those systems costs about $10,000 plus installation costs and do not completely remove the monolayer sheen as required by governmental authorities.

Moreover, while the degree of contamination most often encountered is only minimal, the costs of any of the above options often make those options unjustifiable, especially for small-scale facilities. As a result, many resort to manually removing hydrocarbons from the surface of well water with commonly available polypropylene pads, which absorb low-viscosity hydrocarbons, by dropping such a pad into the well bore with a string attached, retrieving the pad with the string, wringing out the pad and then repeating the process until even the hydrocarbon sheen on the water surface is removed. In fact, the painstaking use of such pads is required even with the high-cost equipment in order to completely remove the monolayer sheen.

High-viscosity hydrocarbon skimmers, on the other hand, have long been an economical means employing endless belts for removing such hydrocarbons from the surface of larger bodies of water. For example, the U.S. Pat. No. 3,508,663, issued to Brill in 1970, discloses such a collector which drives an endless polyurethane loop through a body of water to adsorb hydrophobic materials therefrom. The hydrophobic materials are then removed from the polyurethane loop by means of a scraper and pumped into a storage container. A single motor drives both the polyurethane loop and the pump. Subsequent patents, including U.S. Pat. No. 4,274,957 issued to Koller, U.S. Pat. No. 4,582,604 issued to Bashaw, and U.S. Pat. No. 4,652,372 issued to Threadgill, teach various improvements in high-viscosity hydrocarbon skimmers.

However, employment of such hydrocarbon skimmers in the field of the present invention is unworkable for many reasons. First of all, all previous hydrocarbon skimmers operate on the principle of adsorption wherein the hydrocarbons adhere to the surface of an endless belt and are then removed therefrom by means of scrapers or rollers. Such operation is ineffective with low-viscosity hydrocarbons (i.e., hydrocarbon liquids, such as gasoline or diesel, with viscosity in the range of 1 to 40 S.U.S.) because low-viscosity hydrocarbons tend to slough (or flow) down the endless belt faster than they can be removed and collected. Additionally, even utilization of known hydrocarbon skimmers of the endless belt type for removing high-viscosity hydrocarbons from a monitoring well would require placement of the unit above an open well bore for extended periods during operation. In the meantime, any activities in the proximity of the well would have to be navigated around the skimmer, severely disrupting any business or other surface activities at the location of the well.

SUMMARY OF THE INVENTION

In order to overcome the problems and difficulties of the prior art, it is an object of the present invention to provide a simple, low-cost hydrocarbon collector which is capable of operative placement in common below-grace environments. More particularly, it is an object of the present invention to provide such a collector or a method of collection for employment in a confined space, such as in the well bore of a monitoring well which is typically only four inches in diameter.

It is a further object of the present invention to provide a hydrocarbon collector which enables continuous recovery of low-viscosity hydrocarbons from a monitoring well or other confined space and, more particularly, to provide a hydrocarbon collector which employs an endless belt for recovering low-viscosity hydrocarbons. Another object is to provide a hydrocarbon collector which does not interfere with surface activities and to provide one which operates entirely within a surface-sealed well bore.

Still other objects include providing a hydrocarbon collector which is portable (fitting in a standard briefcase) and easily installed within a confined, below-grad environment such as the well bore of a monitoring well; enabling optimum recovery rates of low-viscosity hydrocarbons; providing a versatile apparatus which is capable of removing all amounts of low-viscosity hydrocarbons from the surface of groundwater, including the smallest amounts present as a monolayer sheen on the surface; and providing for a hydrocarbon recovery method and apparatus which discriminates so that water and other untargeted materials are not collected along with the desired hydrocarbons.

Addressing the aforesaid objects and others, the present invention provides a low-viscosity hydrocarbon collector which incorporates an endless belt adapted to preferentially absorb low-viscosity hydrocarbons. A collector of the invention also has a means for driving the belt through a body of liquid to absorb low-viscosity hydrocarbons therefrom, which includes rollers engaging the endless belt in a manner that squeezes the the hydrocarbons from the belt, and means for collecting the low-viscosity hydrocarbons once they are removed from the belt. The collecting means should be positioned to catch the liquids squeezed from the belt by the first roller, and may be mounted on a support structure common with the first roller.

A means is also included for supporting the belt and feeding it to the first roller from above the point of engagement with that roller. The feeding means should be constructed to engage the belt in a manner which minimizes squeezing of the belt before the belt engages the first roller in order to prevent premature removal of hydrocarbons from the belt. The feeding means would preferably include a second roller connected to the support structure directly above the first roller and having transversely oriented grooves on its surface in order to minimize the premature removal of the low-viscosity hydrocarbons from the belt.

A third roller may complement the operation of the first roller by squeezing the belt between the first and third rollers. Means for biasing either the first or third roller toward the other through the use of springs or the equivalent further enables the squeezing of the belt therebetween.

Another aspect of the present invention is the relationship between the rollers. The invention teaches that such relationship may direct the belt in a linear path from the second roller (or the feeding means) to the first roller in a manner such that the linear path has a positive angle of descent relative to the horizontal so that hydrocarbons are not lost down the upwardly travelling side of the first roller. The rollers may also be configured such that their rotational axes are coplanar in a vertical plane. In any event, a collector configured according to the teachings of the invention fits within a confined space below a surface, such as within the confined space of a well bore of monitoring well.

To enable the collection of the low-viscosity hydrocarbons and to further prevent the premature removal of hydrocarbons from the belt, the belt preferably comprises two layers—a first layer for preferentially absorbing low-viscosity hydrocarbons, and a second layer which is stronger than the first and which directly engages the top (or second) roller in a manner such that the absorptive layer is not trapped between the stronger layer and the surface of the top roller. The belt can then be directed in an opposite fashion so that the absorptive layer engages the first roller between the surface of that roller and the stronger layer of the belt so that squeezing is enhanced at the first roller.

Other features of the invention include the provision of a self-contained unit that has a piston pump for pumping the collected hydrocarbons to the surface and also has a receptacle for separating low-viscosity hydrocarbons from any undesirable liquids such as water that are collected along with the low-viscosity hydrocarbons. That separating receptacle is structured to have a first opening at an elevation higher than a second opening, with the second opening having a valve that is opened by a specific gravity float actuated by the undesirable liquids and not by the low-viscosity hydrocarbons. The means for driving the belt may also be positioned to drive the pump and preferably includes a motor and a common drive shaft.

Many other objects, features and advantages of the present invention will be obvious to one of ordinary skill in the art in light of the following more detailed description of a preferred embodiment. The foregoing and following descriptions of the invention are for exemplary purposes only, however, as the true spirit and scope of the invention are defined by the claims.

BRIEF DESCRIPTION OF THE DRAWINGS

In the drawings appended hereto, wherein like reference numerals refer to like components throughout.

DETAILED DESCRIPTION OF THE PREFERRED EMBODIMENT

Figure 1:
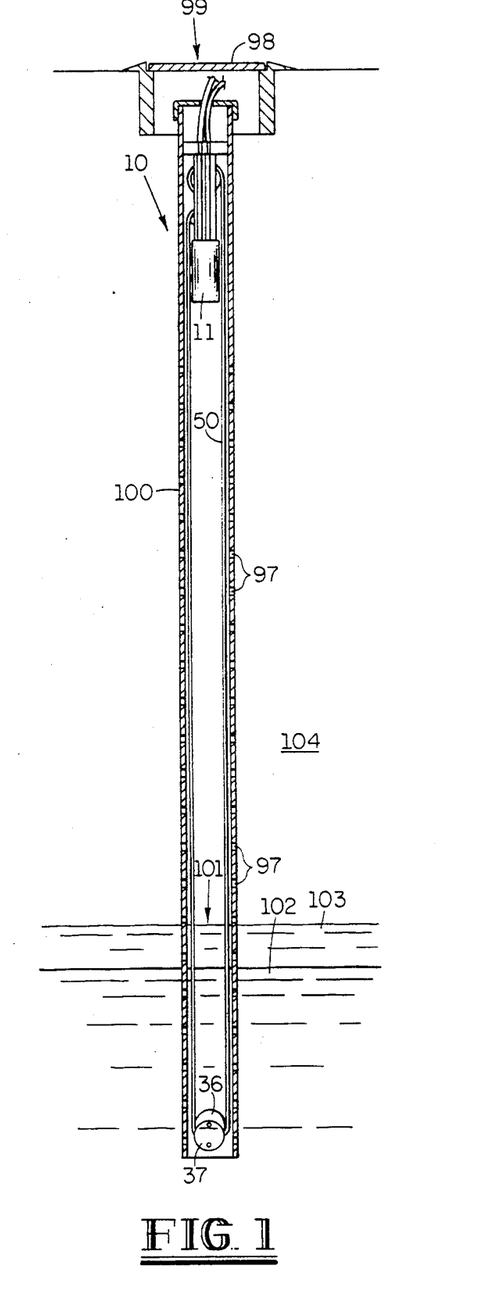
FIG. 1 is a centrally cross-sectioned view of a monitoring well 99 with the hydrocarbon collector 10 of the present invention employed therein and shown full round.

As indicated in the brief description above, FIG. 1 shows a centrally cross-sectioned view of a monitoring well 99 for monitoring the amount of low-viscosity hydrocarbon impurities 103 floating on the groundwater 102 at a given location. The groundwater 102 and hydrocarbons 103, considered together, comprise a body of liquid 101 in well 99. The monitoring well 99 has a vertical well bore 100 and has a lid 98 which seals well 99 at its surface opening. The particular well bore with which the preferred embodiment of the present invention is used has a four-inch (4") diameter and is perforated with slots 97 to allow free flow of liquids to well bore 100 from the surrounding subsurface formations 104.

Figure 2:
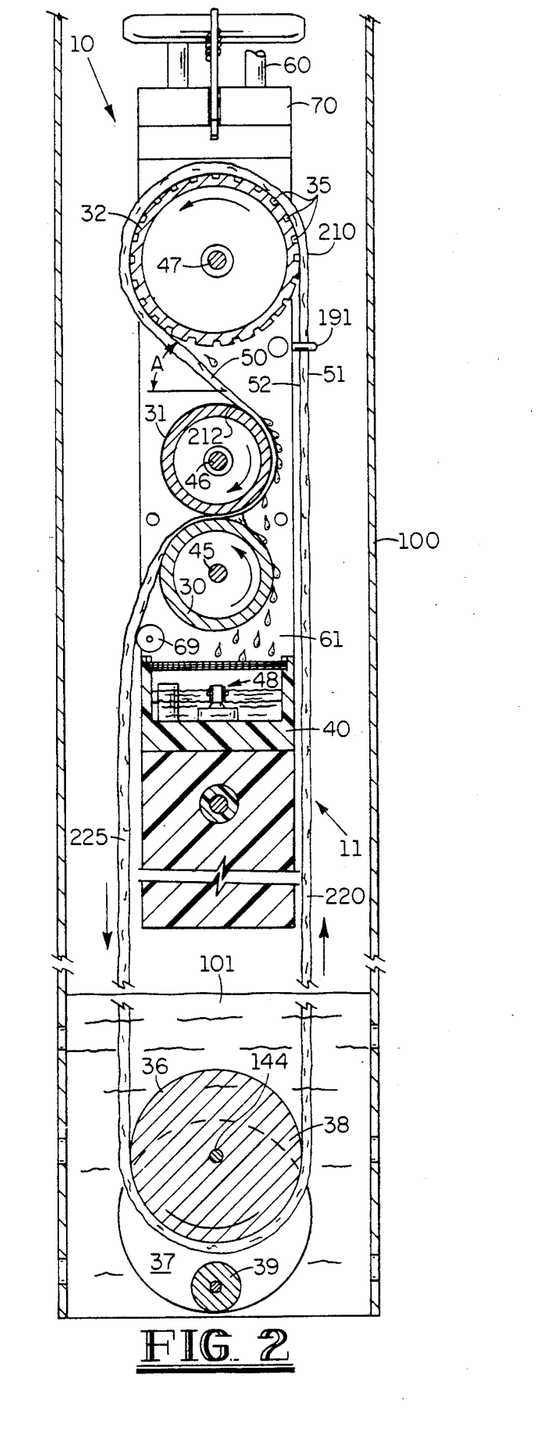
FIG. 2 is a cross-sectional view of a hydrocarbon collector 10 as it is operatively employed in well bore 100, the section thereof being shown in FIG. 4 as sectional line 2—2.
Figure 4:
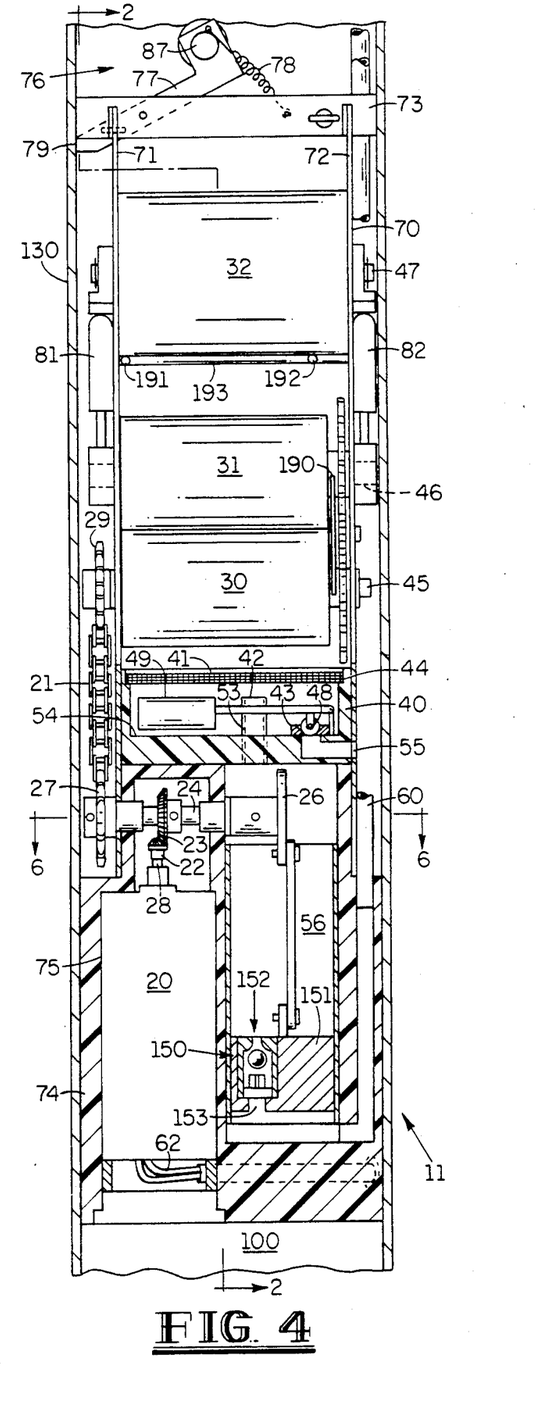
FIG. 4 is a cross-sectional view of the collection unit 11 of hydrocarbon collector 10, the section thereof being shown in FIG. 7 as sectional line 4—4.

The preferred embodiment of the present invention is a hydrocarbon collector 10 which comprises a collection unit 11, an endless belt 50 and an idler 36, as shown in FIGS. 1 and 2. Referring to FIG. 4, the basic components of collection unit 11 are rollers 30–32, support structure 70, locking mechanism 76, separator receptacle 40, pump 150, motor 20 and means for linking various driven components with motor 20. In operation, the collector 10 is positioned completely within the well bore 100 and drives endless belt 50 through the body of liquid 101 to absorb any low-viscosity hydrocarbons such as gasoline or diesel fuel from that liquid 101. Collector 10 then removes the absorbed hydrocarbons from belt 50 by means of a plurality of rollers 30–32, as will be described further herein, and pumps the collected hydrocarbons upwardly out of the well 99 through line 60.

Figure 3:
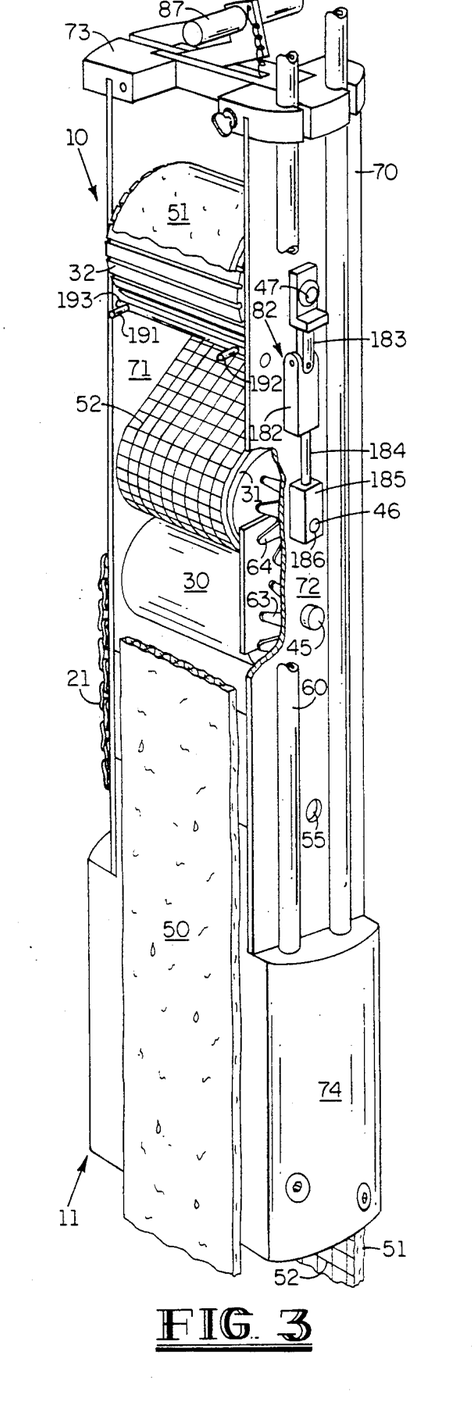
FIG. 3 is a partially cut-away perspective view of hydrocarbon collector 10.

The endless belt 50 is preferably composed of a material which is hydrophobic and oleophilic. More specifically, the belt 50 of the preferred embodiment comprises a fibrous mat 51 of polypropylene bonded to a supportive mesh 52, as shown in FIG. 3. As such, belt 50 preferentially absorbs low-viscosity hydrocarbons rather than water, regardless of whether such hydrocarbons are on the surface of liquid 101 or at some lower depth therein. With the hydrocarbons absorbed therein, belt 50 is then driven upwardly toward rollers 30–32. In contrast, conventional endless belts are composed of neoprene, polyurethane or a similar material which merely adsorbs hydrocarbons on its surface. The absorptive qualities of belt 50 enable removal of low-viscosity hydrocarbons from the body of liquid 101 despite that, as previously discussed, low-viscosity hydrocarbons tend to slough off an endless belt.

While mat 51 provides the medium for absorbing hydrocarbons from the liquid 101, the supportive mesh 52 serves to strengthen and maintain the length and width of belt 50. More specifically, mesh 52 is a non-absorptive porous material, such as the fiberglass or nylon material used for window screening. In any event, mesh 52 is significantly stronger than mat 51 and the weight of belt 50 in operation is, therefore, supported almost entirely by mesh 52.

A weighted idler 36 is provided at the lower end of belt 50 to bias belt 50 in a lightly taut manner beneath hydrocarbon collection unit 11, regardless of the level of the liquid 101. By maintaining belt 50 lightly taut, idler 36 serves to prevent fouling of belt 50 with the wall of well bore 100. The utilization of an endless belt, namely belt 50, suspended tautly by idler 36 beneath collection unit 11 enables continuous operation of collector 10 despite fluctuations in the height of the water table as long as collector 10 is set to suspend idler 36 at a depth which accounts for such fluctuations.

Idler 36 is adapted to roll on belt 50 in the limited confines of well bore 100 without falling off of belt 50. Idler 36 particularly comprises a core 38 for rolling on belt 50 as belt 50 is driven by collection unit 11. Idler 36 also comprises circular guide plates 37 and roller 39. The circular guide plates 37 are rotatably connected at each end of core 38. Roller 39 spans between guide plates 37 and is rotatably connected to each of guide plates 37. The circular shape of guide plates 37 tends to prevent fouling with belt 50; however, in the event such fouling does occur, guide plates 39 rotate about the central axis 144 of core 38 until roller 39 engages belt 50, at which point roller 39 rolls relative to belt 50 in order to prevent frictional losses. Roller 39 and guide plates 37 prevent idler 36 from falling off belt 50. Obviously, as core 38 rolls on belt 50 to remain at the lower end thereof, the guide plates 37 ordinarily rotate to remain in the position shown in FIGS. 1 and 2 relative to core 38.

At the upper end of belt 50, belt 50 is directed between guides 191 and 192 and rolls on and in between rollers 30–32 and 69, as shown in FIG. 2. More specifically, the ascending portion 220 of belt 50 is taut between idler 36 and roller 32. From the point 210 of engagement with roller 32, belt 50 is directed through a winding path, first over roller 32, then downwardly around roller 31, into engagement between rollers 30 and 31 and then downwardly around guide roller 69. The descending portion 225 of belt 50 is taut between guide roller 69 and idler 36.

Each of rollers 30–32 is an annular cylinder rotatable about a central shaft 45–47, respectively, which is connected to a support structure 70. Each of shafts 45–47 is horizontal and is parallel to the others of shafts 45–47. The axes of shafts 45–47 are preferably coplanar in a vertical plane. The fourth roller, guide roller 69, is also rotatably connected to support structure 70. Roller 32 has grooves 35 (not shown in FIG. 4) oriented transversely (i.e., perpendicularly to the direction of travel) on its outer surface. The outer surfaces of rollers 30 and 31 are smooth, although textured surfaces could obviously be used for better traction to drive belt 50.

Referring to FIG. 4, belt 50 is driven by roller 30 which, in turn, is driven by motor 20. Motor 20 is an electric motor assembly including a gear box and having a rotary output shaft 28 driving pinion 22, which is a small bevel gear. Shaft 28 and motor 20 are vertically oriented in order to further facilitate placement of collector 10 in the limited confines of well bore 100. The teeth of pinion 22 are interdigitated with the teeth of a bevel gear 23 which is integral with a drive shaft 24. Drive shaft 24 is horizontally oriented and is rotatably supported by support structure 70. Drive shaft 24 has a sprocket 27 at one of its ends for driving a drive chain 21 which, in turn, drives roller 30. A sprocket 29 is rigidly connected to roller 30, and drive chain 21 mechanically links sprocket 29 with sprocket 27. Wires 62, which are connected to a power source (not shown) above collector 10, supply electric power to motor 20.

Figure 7:
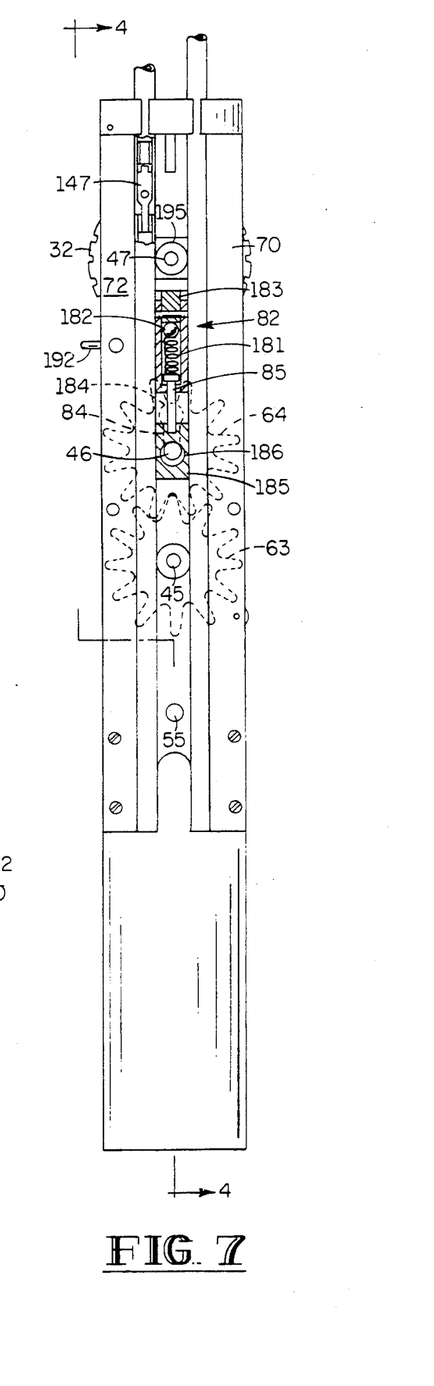
FIG. 7 shows a side elevational view of the collection unit 11 of the present invention.

Referring also to FIG. 7, in order to prevent slippage between rollers 30 and 31 and yet allow vertical movement of shaft 46 in order to accommodate various belt thicknesses, star gears 63 and 64 (shown in hidden line) are rigidly connected to the rollers 30 and 31, respectively. The teeth of gear 64 are meshed with the teeth of gear 63, and gears 63 and 64 thus link the rotation of roller 31 with that of roller 30. For maximum utilization of the space in well bore 100, gears 63 and 64 are positioned on the respective ends of rollers 30 and 31 opposite the end of roller 30 to which sprocket 29 is connected.

Roller 31 is biased toward roller 30 by spring assemblies 81 and 82 (shown in FIG. 4) in order to squeeze belt 50 between rollers 30 and 31. As shown in FIGS. 3 and 7, spring assembly 82 essentially incorporates a spring 181 compressed between an end of shaft 47 and an end of the shaft 46 of roller 31. More specifically, spring 181 is contained within an enclosure 182 which is pivotally connected to member 183. Member 183 bears upwardly against the end of shaft 47 and is held in place by a C-clip 195. The compressive force of spring 181 is transmitted to shaft 46 by means of rod 184 which is connected in telescopic relation with enclosure 182. Rod 184 is rigidly connected to journal block 185 having a bore 186 for rotatably receiving shaft 4 therethrough.

Journal block 185 can be disengaged from shaft 46 by pivoting enclosure 182 outwardly relative to member 183, thereby releasing spring 181 from its compressed state and, likewise, shaft 46 from its spring-biased state to enable removal of shaft 46 from the unit 11, as will be described further herein. Spring assembly 81 is identical to spring assembly 82 and, thus, roller 31 is uniformly biased toward roller 30 to squeeze belt 50 therebetween.

Such squeezing of belt 50 serves to liberate hydrocarbons therefrom and also to provide sufficient engagement of belt 50 between rollers 30 and 31 to drive belt 50. The outer surface of each of rollers 30 and 31 may, although not shown, be knurled or otherwise textured in a complementary fashion in order to further improve traction between belt 50 and rollers 30 and 31.

Each end of shaft 46 is slidably engaged in a vertical keyway 84 (shown in hidden line) in the respective one of side walls 71 and 72 of support structure 70. The keyways 84 are each provided with a keyhole 85 at the upper end thereof, through which shaft 46 can be inserted or removed. Each end of shaft 46 has a circumferential groove which slidably engages he respective side wall 71, 72 when shaft 46 is moved downwardly in the respective keyway 84 from the respective keyhole 85. Conversely, shaft 46 can be removed from unit 11 by lifting its ends into keyholes 85 and then sliding it in an axial direction. Removal of shaft 46, in turn, allows removal of roller 31. The previously described releasability of spring assemblies 81 and 82 from shaft 46 obviously enables the removal of shaft 46 from keyways 84 since spring assemblies 81 and 82 bias shaft 46 toward the lower ends of keyways 84. The purpose of having shaft 46 removable and roller 31 removable is to aid in installing and removing belt 50.

Referring again to FIG. 1, belt 50 is preferably long enough to accommodate any anticipated fluctuations of the water table in monitoring well 99 so that at least the lower end of belt 50 is always submerged in liquid 101 while the elevation of unit 11 always remains above the level of liquid 101. The weight of such a length of belt absorbed with hydrocarbons, however, is sufficient to cause some squeezing of belt 50 upon engagement with a roller. Such squeezing could lead to loss of low-viscosity hydrocarbons from belt 50 back to the body of liquid 101; however, during engagement of belt 50 with roller 32, belt 50 is positioned so that the mesh 52 (rather than the mat 51) faces roller 32. In this manner, because mesh 52 is the stronger element of belt 50, tension in belt 50 is sustained almost entirely by mesh 52 rather than mat 51 and premature squeezing of the fibrous mat 51 is therefore avoided since mat 51 is not engaged between mesh 52 and roller 32 while belt 50 rolls thereon. Because the fibrous mat 51 is not significantly compressed by the weight of belt 50 during engagement with roller 32, belt 50 is said to be in non-compressive engagement with roller 32.

Nevertheless, some squeezing of the fibrous mat 52 occurs due solely to its flexure as it conforms with the surface of roller 32. To counter that problem, grooves 35 of roller 32 minimize return of hydrocarbons back to the body of liquid 101 by creating periodic low pressure points on belt 50 above each of the grooves 35 so that hydrocarbons will tend to remain in belt 50 above the grooves 35. Grooves 35 also tend to catch any hydrocarbons which are squeezed from belt 50 onto the surface of roller 32 and carry those hydrocarbons along with belt 50 to prevent loss back to the body of liquid 101 in well bore 100. As roller 32 continues its rotation, any hydrocarbons collected in grooves 35 eventually drip back onto belt 50.

Additionally, roller 32 is relatively large in order to further minimize any squeezing and any accompanying loss of low-viscosity hydrocarbons from belt 50 which might be caused by engagement between belt 50 and roller 32. In the preferred embodiment, roller 32 is as large as the four-inch well bore 100 permits without causing engagement of belt 50 with the well bore 100. By maximizing the diameter of roller 32, the pressure exerted by roller 32 on belt 50 is distributed over a greater effective area, and the radius of curvature of belt 50 as it rolls over roller 32 is maximized. Therefore, any localized squeezing of belt 50 due to its engagement with roller 32 is minimized.

Roller 31 is separated and biased away from roller 32 so that belt 50 is not engaged and/or squeezed therebetween. That separation also causes belt 50 to descend at an angle A of descent from the horizontal such that hydrocarbons collecting between belt 50 and roller 31 do not spill down the upwardly travelling side of roller 31. The vertical alignment of roller 32 relative to roller 31 also results in engagement between belt 50 and roller 31 at an angle from the horizontal which is equivalent to angle A. Essentially, that angle A should be greater than zero.

When belt 50 is engaged by roller 31, the fibrous mat 51 is compressed between the support mesh 52 and the surface of roller 31, thereby squeezing significant amounts of hydrocarbon from belt 50. Due to the separation between rollers 31 and 32 and the resulting angle A of descent, any liquid squeezed from belt 50 by such engagement is eventually directed through belt 50 in the direction of rotation of roller 31. Note that any liquid collecting in the region 212 formed between belt 50 and the surface of roller 31 does not spill down the upwardly travelling side of roller 31 since gravity and the rotation of roller 31 oppose such spilling. Hydrocarbons collected in region 212, therefore, remain there until being re-absorbed into or passing through mat 51. Belt 50 is said to be in compressive engagement with roller 31 since the fibrous mat 51 is compressed between supporting mesh 52 and the surface of roller 31 due to the tension of belt 50.

Any hydrocarbons remaining on or in belt 50 upon reaching the interface between rollers 30 and 31, in any event, is squeezed therefrom by engagement therebetween. Thus, rollers 30-32 operate in combination to remove low-viscosity hydrocarbons absorbed and carried in belt 50 while minimizing return of any of the hydrocarbons in belt 50 back to the body of liquid 101. Such optimum removal is further ensured by the virtually complete enclosure of a drip zone 61 in which hydrocarbons removed from belt 50 drip toward a receptacle 40. For reference purposes, that drip zone 61 is the space above receptacle 40 which is bounded by belt 50 and the surfaces of rollers 30 and 32. It is particularly advantageous that, in the unlikely event that the movement of rollers 30-32 and belt 50 propel squeezed hydrocarbons in a direction other than toward receptacle 40 (i.e., to the right in FIG. 2), such propelled hydrocarbons would most likely come into contact with the ascending portion 220 of belt 50, only to be redirected over roller 32 with belt 50.

Receptacle 40 is a receptacle for collecting liquid removed from belt 50 by rollers 30-32. As shown in FIG. 4, receptacle 40 has three fluid openings: an inlet 41, a first outlet 43 and a second outlet 42. The upper face of receptacle 40 is completely open to form inlet 41 directly beneath rollers 30-32, except that screen 44 is provided across inlet 41 to filter liquids passing into receptable 40. Receptacle 40 also serves as a separator for separating hydrocarbons from any water which might be collected by hydrocarbon collector 10. That function of receptacle 40 is especially advantageous since, although belt 50 preferentially absorbs hydrocarbons from the body of liquid 101, water can be absorbed by belt 50 when no hydrocarbons are present in the liquid 101 for extended periods of time. First outlet 43 is provided in receptacle 40 to allow removal of water from within receptacle 40, and second outlet 42 is provided to allow passage of hydrocarbons from receptacle 40 lo a pump chamber 56 (shown in FIG. 4). Second outlet 42 is provided at the upper end of a pipe 53 rising above the level of first outlet 43.

Referring to FIG. 4, in order to ensure that only hydrocarbons are directed into pump chamber 56, first outlet 43 is provided with a float valve 48 which opens first outlet 43 when water has risen within receptacle 40 to a predetermined height above first outlet 43. The float 49 of float valve 48 is a specific gravity float composed of a material having a density lighter than water but heavier than the hydrocarbons being collected by collector 10. Thus, as hydrocarbons fill receptacle 40, such hydrocarbons will eventually spill through the second outlet 42 in pipe 53 without causing float 49 to open outlet 43. On the other hand, if a mixture of water and hydrocarbons is being collected within receptacle 40, the hydrocarbons will float on top of the water until they spill through second outlet 42, and the water will eventually trigger float valve 48 to open first outlet 43, thereby draining the denser water from adjacent the floor 54 of receptacle 40. Water being drained through first outlet 43 is directed through a passage having a drain opening 55 through a wall of the support structure 70. The drain opening 55 directs such water against the side of well bore 100 and back toward the body of liquid 101 without coming into contact with belt 50.

Pipe 53 defines a passage in communication with pump chamber 56 so that hydrocarbons flowing from receptacle 40 are directed through pipe 53 into pump chamber 56. The hydrocarbons are then pumped from pump chamber 56 by a pump 150 out of well bore 100 by way of line 60. Pump 150 is a piston pump that is also driven by motor 20. To drive pump 150, drive shaft 24 is provided with a cam-like crank 26 at one end. The piston 151 of pump 150 is reciprocated in a vertical direction and has a valved passage 153 therethrough for enabling its operation. The valve of valved passage 153 is a ball valve 152 which closes with each downward stroke and opens during each upward stroke of piston 151. The character of pump 150 as a piston pump enables collector 10 to be operated at virtually any depth encountered in monitoring wells due to the inherent efficiencies and positive displacement of piston pumps, in contrast to the vacuum pumps which are commonly used to recover liquids from a well. Additionally, as shown in FIG. 7, an in-line check valve 147 is provided in line 60 to prevent the pumped hydrocarbons from flowing back to pump 150.

One method for maximizing the rate of recovery for a hydrocarbon collector is to increase the width of the endless belt that is employed on the apparatus. In a well bore of limited dimensions, the ratio between the belt width and the width of the device driving the belt (referred to as the "utilization ratio") can, therefore, be critical. Collector 10 of the present invention maximizes that belt width and the utilization ratio for a given well bore (and thereby maximizes the recovery rate) by positioning the largest roller, roller 32, above rollers 30, 31 and 69 and by vertically stacking, or aligning, rollers 30-32. Specifically, a belt width utilization ratio of 70:100 is realized in the preferred embodiment of the present invention. For comparison, conventional hydrocarbon skimmers typically have a utilization ratio of about 50:100 or less. In addition, although the invention enables optimum utilization of the available space in well bore 100, a water table depression pump (not shown) or a soil venting system (also not shown) or both could be employed in well 99 in conjunction with collector 10 to further facilitate recovery of the hydrocarbons.

Referring to FIG. 4, support structure 70 comprises side walls 71 and 72, crown 73 and block 74. Block 74 defines pump chamber 56 and motor enclosure 75 in parallel. Receptacle 40 is rigidly but removably mounted to block 74. A locking mechanism 76 is all ached to crown 73 for locking unit 11 in place at any depth within well bore 100. Side walls 71 and 72 are thin parallel plates which span the distance between block 74 and crown 73, joining support structure 70 into an integral structure. Plate 190 and guides 191 and 192 are connected in fixed relation with side walls 71 and 72 for guiding belt 50 so that it does not become caught in gears 63 and 64 or between rollers 30-32 and walls 71 and 72. Plate 190 is connected to wall 72, and guides 191 and 192 are post-like protrusions from a cross bar 93 which is rigidly connected between walls 71 and 72.

Referring to FIG. 4, locking mechanism 76 basically comprises a lever 77 pivotally connected to crown 73 and spring-biased by spring 78 in a position such that the distal end 79 of lever 77 engages the wall 130 of well bore 100 to lock unit 11 in place at any desired depth in the well bore 100. Because distal end 79 is maintained beneath the pivotal connection with crown 73, the weight of collector 10 tends to hold that distal end 79 engaged with the wall 130 of well bore 100. A handle 87 is rigidly connected to the upper end of lever 77 so that collector 10 can be lifted by handle 87. The spring constant of spring 78 is sufficient to bias the distal end 79 of lever 77 against wall 130 to lock collector 10 in place when handle 87 is released; however, that spring constant of spring 78 is sufficiently small so that locking mechanism 76 is disengaged from wall 130 when collector 10 is lifted by handle 87. Thus, the locking mechanism 76 provides for immediate installation of collector 10 in well bore 100 at any depth.

Figure 5:
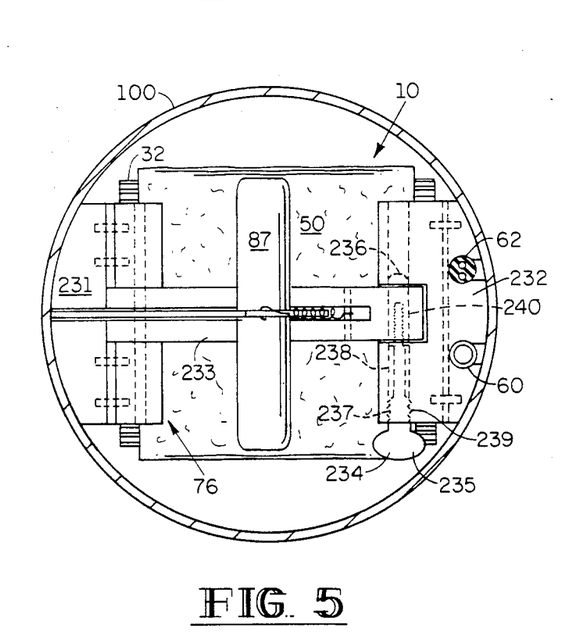
FIG. 5 shows a top view of hydrocarbon collector 10 as it is operatively employed in well bore 100, particularly showing the locking mechanism 76 of collector 10.
Figure 6:
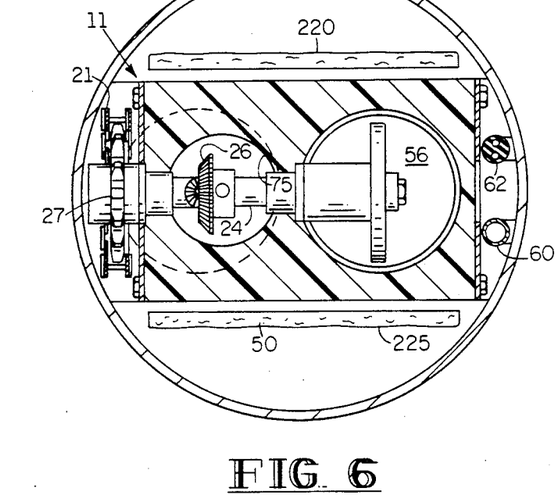
FIG. 6 shows a cross-sectional view of the collection unit 11 as sectioned on sectional line 6—6 of FIG. 4, showing the drive shaft 24 and related components in full round and also showing belt 50 operatively employed thereon.

Referring to FIG. 5, crown 73 further comprises blocks 231 and 232, cross member 233 pivotally connected at a first end to block 231, and pin 234 connecting the second end of cross member 233 to block 232. Pin 234 is formed of threaded member 235 and ferrule 236. Threaded member 235 has threads 237 thereon which are threadable into the threads 239 at one end of bore 238. Ferrule 236 has a diameter which enables slidable movement within bore 238 but which is too large to pass by threads 239. Thus, with ferrule 236 threaded onto the end of threaded member 235 after threaded member 235 has been inserted through bore 238, pin 234 is only partially removable from within bore 238 but pin 234 can still be threadably engaged or disengaged with threads 239. In normal operation, a bore 240 through the releasable end of cross member 233 is held in alignment with bore 238 by ferrule 236 such that cross member 233 is fixed relative to block 232. Then, when one desires to change belt 50, in addition to removing roller 31 from unit 11, pin 234 can be threadably disengaged and ferrule 236 retracted from bore 240 so that cross member 233 can then pivot relative to block 231.

In summary, collector 10 is a collector which enables continuous recovery of low-viscosity hydrocarbons from monitoring well 99 through the employment of rollers 30-32 and 69 which cooperate within the limited confines of well bore 100 to squeeze the low-viscosity hydrocarbons from an absorption belt 50 and pump only the targeted hydrocarbons to the surface. The configuration and particular features of collector 10 enable its employment over extended periods of time within a well bore without interfering with surface activities above well 99 and while still enabling sealing of the well 99 at lid 98. Such operation could easily be modified with the incorporation of a timer or other controls in the electrical circuit powering motor 20 to enable still further advantages. In any event, unit 11 is sufficiently compact such that it can be removed from the well 99 and stored in a briefcase along with idler 36 and belt 50 (with belt 50 coiled separately).

Although the invention has been described in conjunction with the foregoing specific embodiment of a hydrocarbon collector 10, many alternatives, variations and modifications will be apparent to those of ordinary skill in the art. Those alternatives, variations and modifications are intended to fall within the spirit and scope of the invention as defined by the following claims.

What is claimed is:

1. A low-viscosity hydrocarbon collector comprising:
   a support structure;
   an endless belt for absorbing low-viscosity hydrocarbons from a body of liquid;
   means for driving said belt through said body of liquid, said driving means comprising;
   a first roller engaging said belt in a manner which squeezes said belt to remove hydrocarbons therefrom, said first roller being rotatably connected to said support structure; and
   means for feeding said belt to said first roller from above a point of initial engagement between said belt and said first roller, said feeding means being connected to said support structure and engaging said belt in a manner which minimizes premature removal of low-viscosity hydrocarbons from said belt;
   means for collecting low-viscosity hydrocarbons which are removed from said belt, said collecting means being mounted to said support structure, said support structure configured to fit within a well bore.

2. The low-viscosity hydrocarbon collector of claim 1 wherein said feeding means comprises a second roller rotatably connected to said support structure.

3. The low-viscosity hydrocarbon collector of claim 2 further comprising:
   a third roller rotatably connected to said support structure, said belt being directed between said first and third rollers; and
   means for biasing said first and third rollers toward one another to squeeze said belt therebetween.

4. The low-viscosity hydrocarbon collector of claim 3 wherein the axis of said third roller lies in a common vertical plane with the axis of said first and second rollers.

5. The low-viscosity hydrocarbon collector of claim 2 wherein said belt is directed in a linear path from said second roller to said first roller in a manner such that said linear path has a positive angle of descent relative to the horizontal.

6. The low-viscosity hydrocarbon collector of claim 2 wherein the rotational axis of said first roller lies in a vertical plane common with the rotational axis of said second roller.

7. The low-viscosity hydrocarbon collector of claim 1 wherein said belt comprises:
   a first layer comprising a medium for preferentially absorbing low-viscosity hydrocarbons;
   a second layer having properties such that substantially all the force for lifting said belt from said body to said feeding means is transmitted through said second layer rather than through said first layer, said first layer being bonded to said second layer, and said second layer engaging said feeding means in a manner such that said second layer is positioned between said first layer and the surface of said feeding means.

8. The low-viscosity hydrocarbon collector of claim 7 wherein said first layer is engaged by said first roller in a manner such that said first layer is positioned between said first roller and said second layer to enable squeezing of said first layer.

9. The low-viscosity hydrocarbon collector of claim 2 wherein the surface of said second roller has features for minimizing squeezing of said belt.

10. The low-viscosity hydrocarbon collector of claim 1 wherein said feeding means comprises a second roller having transverse grooves on the surface thereof.

11. The low-viscosity hydrocarbon collector of claim 1 further comprising means for pumping the collected low-viscosity hydrocarbons to a location outside said well bore.

12. The low-viscosity hydrocarbon collector of claim 1 wherein said collecting means further comprises means for separating low-viscosity hydrocarbons from other undesirable liquids collected therein.

13. The low-viscosity hydrocarbon collector of claim 1 wherein said collecting means comprises a receptacle having a first outlet and a second outlet, said first outlet being positioned at an elevation above said second outlet for directing low-viscosity hydrocarbons to a pump chamber.

14. The low-viscosity hydrocarbon collector of claim 13 further comprising:
   a valve for opening and closing said second outlet; and
   a specific gravity float connected to said valve for opening said valve when undesirable liquid in said receptacle reaches a certain level, said certain level being beneath the elevation of said first opening.

15. A low-viscosity hydrocarbon collector comprising:
    a support structure configured to fit within a well bore;
    an endless belt for absorbing low-viscosity hydrocarbons from a body of liquid;
    means for collecting low-viscosity hydrocarbons which are removed from said belt, said collecting means being mounted to said support structure;
    means for pumping collected low-viscosity hydrocarbons to a location outside said well bore;
    means for driving said belt through said body of liquid, said driving means comprising;
    a motor;
    a first roller engaging said belt in a manner which squeezes said belt to remove hydrocarbons therefrom, said first roller being rotatably connected to said support structure; and
    a common drive shaft for driving said pumping means and said belt, said drive shaft being operatively connected between said motor and said pumping means and between said motor and said first roller;
    means for feeding said belt to said first roller from above a point of initial engagement between said belt and said fist roller, said feeding means being connected to said support structure and engaging said belt in a manner which minimizes premature removal of low-viscosity hydrocarbons from said belt.

16. A low-viscosity hydrocarbon collector of claim 15 wherein said drive shaft is parallel to the rotational axis of said first roller.

17. The low-viscosity hydrocarbon collector of claim 16 wherein said motor has a longitudinal axis and said motor is mounted to said support structure in an orientation such that the axis of said motor is vertical and is parallel to the central axis of said pumping means which is comprised of a piston pump.

* * * * *